United States Patent
Roesner et al.

(10) Patent No.: US 10,967,555 B2
(45) Date of Patent: Apr. 6, 2021

(54) PLASTIC EXTRUDER WITH MOBILE OPERATOR STATION AND METHOD OF OPERATING SAME

(71) Applicant: Reifenhaeuser GmbH & Co. KG Maschinenfabrik, Troisdorf (DE)

(72) Inventors: Andreas Roesner, Bonn (DE); Thomas Fett, Troisdorf (DE); Mark Hilgers, Troisdorf (DE); Christoph Lettowsky, Aachen (DE); Jens Mager, Cologne (DE); Christian Stelter, Ingelheim (DE); Asmir Vodencarevic, Erlangen (BA)

(73) Assignee: REIFENHAEUSER GMBH & CO. KG MASCHINENFABRIK, Troissdorf (DE)

( * ) Notice: Subject to any disclaimer, the term of this patent is extended or adjusted under 35 U.S.C. 154(b) by 325 days.

(21) Appl. No.: 15/784,116

(22) Filed: Oct. 14, 2017

(65) Prior Publication Data

US 2018/0104882 A1  Apr. 19, 2018

(30) Foreign Application Priority Data

Oct. 18, 2016  (DE) .......................... 102016119868.4

(51) Int. Cl.

| | |
|---|---|
| *B29C 48/92* | (2019.01) |
| *H04W 4/02* | (2018.01) |
| *H04L 29/08* | (2006.01) |
| *B29C 48/025* | (2019.01) |
| *B29C 48/28* | (2019.01) |
| *G06Q 10/10* | (2012.01) |

(52) U.S. Cl.
CPC ............ *B29C 48/92* (2019.02); *B29C 48/025* (2019.02); *B29C 48/28* (2019.02); *H04L 67/12* (2013.01); *H04L 67/34* (2013.01); *H04W 4/023* (2013.01); *G06Q 10/10* (2013.01)

(58) Field of Classification Search
CPC ......... B29C 48/92; B29C 48/25; B29C 48/00; B29C 48/28; H04L 67/12; H04L 67/34; H04W 4/023; G06Q 10/10
See application file for complete search history.

(56) References Cited

U.S. PATENT DOCUMENTS

| | | | | |
|---|---|---|---|---|
| 5,612,719 A | * | 3/1997 | Beernink | ............ G06F 3/04883 |
| | | | | 345/172 |
| 2006/0277269 A1 | * | 12/2006 | Dent | ...................... B65G 43/08 |
| | | | | 709/217 |
| 2015/0037447 A1 | * | 2/2015 | Rechter | ................... B29C 48/92 |
| | | | | 425/135 |

FOREIGN PATENT DOCUMENTS

| | | | | |
|---|---|---|---|---|
| EP | 1382430 A1 | * | 1/2004 | ............. B29C 48/92 |
| JP | 2000334810 A | * | 12/2000 | ............. B29C 48/92 |

* cited by examiner

*Primary Examiner* — Joseph S Del Sole
*Assistant Examiner* — Jamel M Nelson
(74) *Attorney, Agent, or Firm* — Andrew Wilford

(57) ABSTRACT

A plastic-extrusion system comprises a plurality of system components including an extruder and a collection device for collecting the extruded plastic material. The plastic-extrusion system has an operator station designed for taking in and outputting data of the plastic-extrusion system. The operator station further has a mobile terminal including a screen of a graphical user interface as well as a camera. The plastic-extrusion system is associated with at least one information source, and preferably a plurality of information sources. The operator station is configured so as to provide access to the at least one information source, and preferably to the plurality of information sources.

11 Claims, 1 Drawing Sheet

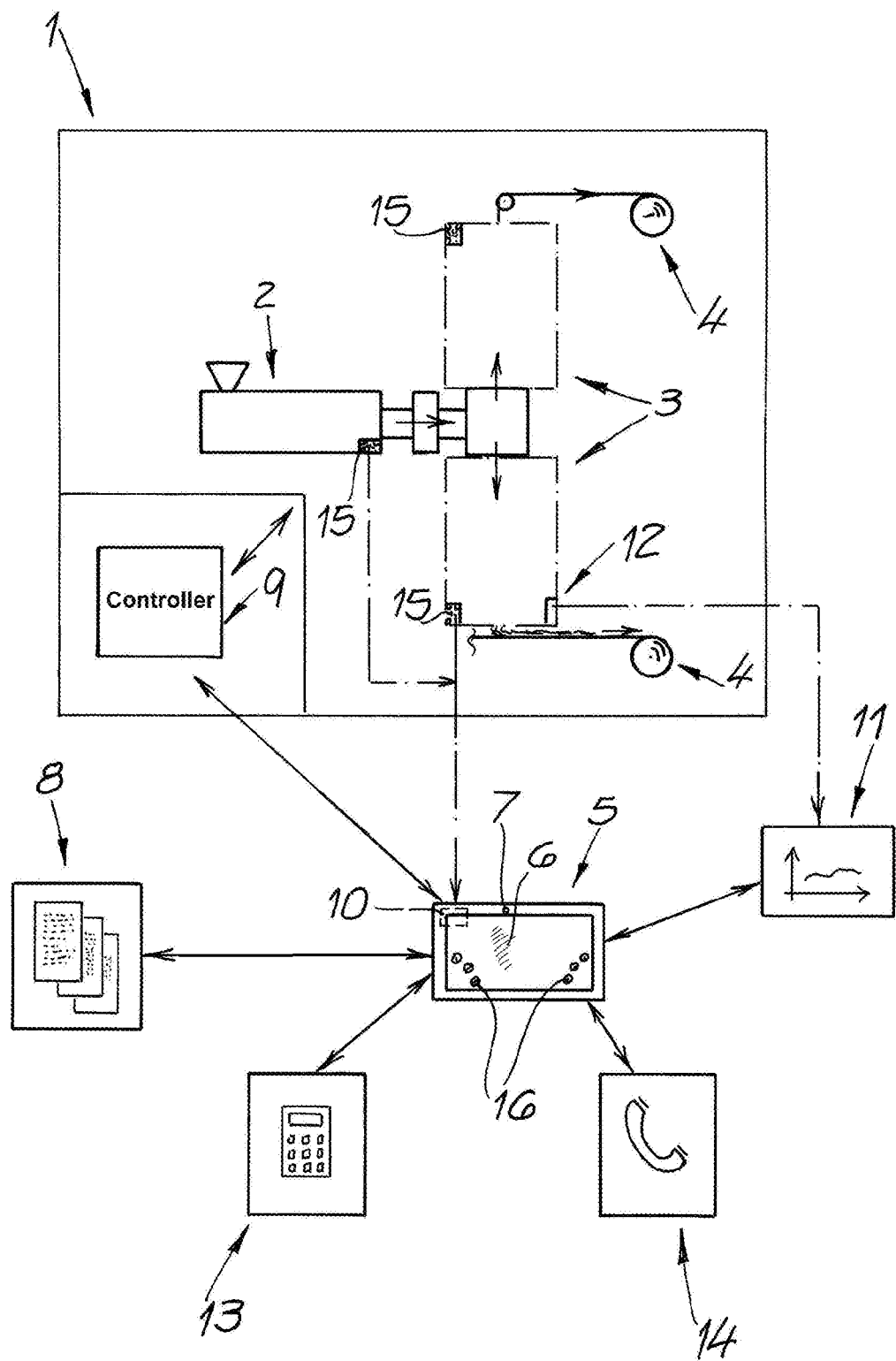

PLASTIC EXTRUDER WITH MOBILE OPERATOR STATION AND METHOD OF OPERATING SAME

FIELD OF THE INVENTION

The invention relates to a plastic-extrusion system and to a method of operating this plastic-extrusion system.

BACKGROUND OF THE INVENTION

A typical plastic-extrusion system comprises a plurality of system components including an extruder and a device for collecting the extruded plastic material. The plurality of system components furthermore includes a system controller for controlling with or without feedback the plastic-extrusion system. Also, an operator station is provided for operating the system controller, the operator station having for example a monitor and a keyboard.

Such plastic-extrusion systems are sufficiently known from practice. However, the disadvantage is that this known design of plastic-extrusion systems makes the operation and monitoring of ongoing production a complex task. The reason is that it is necessary for the employee in charge to have access to a wide range of information sources directly on-site so as to operate and monitor ongoing production. A processor associated with the plastic-extrusion system, such as in the form of a system server, however, does not offer this kind of comprehensive access. Also, it is frequently necessary to take photos or videos of the ongoing production operation or of system components during operation so as to monitor production, or to search for faults in the event of warning messages. Such data must then for example be transmitted to the line server in a cumbersome process and further analyzed there, or be linked to other information from other data sources. This also involves significant complexity just to be able to ensure ongoing operation.

OBJECTS OF THE INVENTION

It is therefore the object of the invention to reduce the complexity during production.

In particular, it is the object of the invention to considerably make operating the plastic-extrusion system easier.

SUMMARY OF THE INVENTION

To achieve these objects, the invention provides a plastic-extrusion system comprising a plurality of system components including an extruder and a device for collecting the extruded plastic material, the plastic-extrusion system having an operator station designed for taking in and outputting data of the plastic-extrusion system, the operator station having a mobile terminal including a separate screen having a graphical user interface, and the operator station comprises a camera, the plastic-extrusion system being associated with at least one information source not in the mobile terminal, and preferably a plurality of information sources, the operator station being configured so as to provide access to the at least one information source, and preferably to the plurality of information sources.

The plastic-extrusion system is preferably designed to produce nonwoven fabric in particular formed by filaments (of a length corresponding to production cycle). Particularly preferably, the plastic-extrusion system is a melt-blowing or spun-bonding line. According to a second preferred embodiment, the plastic-extrusion system is used to produce films, and in particular blown films.

The plurality of system components advantageously comprises downstream of the extruder and upstream of the collection device a device for treating the extruded plastic material. The treatment device comprises, for example, a spinneret and/or one or more rollers and/or a device for blowing a film. The plurality of system components particularly preferably have a system controller. The system controller is designed to control the extruder and/or the treatment device and/or the collection device.

The term "mobile terminal" includes, in particular, a tablet, a smart phone, a smart watch or smart glasses. The term "screen" in particular also refers to the screens of smart glasses that are viewed by the particular wearer of the smart glasses. The operator station can preferably be operated by gesture control and/or eye control and/or voice control. The term "gesture control" in particular does not refer to the operation by a keyboard having keys that are physically fixed.

It is advantageous when the interface is designed to control at least one, especially several, and preferably all of the system components. The plastic-extrusion system advantageously comprises a system controller, and the operator station is preferably designed to control the system controller, so that at the same time advantageously one or more of the system components can be controlled. The operator station or the system controller is preferably designed to control the one system component, or the multiple system components, by automatically taking rules or regulations into consideration. The rules or regulations may be statutory regulations, corporate regulations, or rules related to occupational health and safety.

According to a particularly preferred embodiment, the use of the interface is context-sensitive. The term "context-sensitive" refers in particular to a graphical interface of the operator station that is adapted to the particular situation. Preferably, a selection menu is adapted depending on the situation. In this way, the operator station can for example be location-sensitive such that the operator station detects its own position. In this case, the context sensitivity of the operator station may be set up such that the nearby system components are displayed on the screen of the operator station. Furthermore, the operator station may be sensitive with respect to system components and, for example, identify the system components. In such a case, the context sensitivity of the operator station may be such that the corresponding system component is identified on the screen of the operator station and/or instantaneous process parameters, or a progression of one process parameter or of multiple process parameters, is displayed on the screen. Finally, it is possible for the operator station to be maintenance-sensitive. For example, the operator station may provide reminders of regular maintenance appointments, or in the case of a warning signal, it may display a telephone number of a technical service department of the vendor that can be dialed directly.

According to a preferred embodiment, the operator station is teachable and, in particular, has teachable context sensitivity. The teachability is preferably based on an interpolation of the previous conduct of the user. In particular, the graphical user interface is adapted to the particular context as a result of the teachability. For example, a custom selection menu may be appropriately displayed in a certain context. If, for example, the user previously selected one or more menu items of this selection menu more frequently in this context, the more frequently selected menu items will be highlighted or the content thereof will be immediately displayed in full.

According to a particularly preferred embodiment, the plastic-extrusion system comprises a read module that is designed to be able to identify the system component based on read data related to a system component. It is preferred that a marker, such as a QR code or an RFID chip, is provided on at least one system component. The read module is advantageously designed to read the marker. The read data involves QR or bar codes or RFID data, for example. According to another embodiment, the camera, together with object recognition software, forms the read module. In this way, the operator station may identify one or more system components with the aid of the camera and the object recognition software. In this case, the read data, for example, corresponds to a photo or a video of the respective system component.

According to a particularly preferred embodiment, the operator station is designed to display information from the at least one information source or from several of the plurality of information sources regarding the identified system component on the screen of the operator station, the information going beyond the informational content of the read data read out by the read module. In this way, each system component is directly linked to the information sources. It is thus for example possible to display the following information on the screen of the operator station on-site (for example, directly in front of the system component per se): instantaneous method parameters and/or progressions of method parameters and/or control settings and/or possible replacement parts for the plastic-extrusion system and/or a communication option for the vendor and/or for a raw material supplier (telephone number, automatically drafted e-mail for orders or the like) and/or commercial data (amount of raw material still in stock, reorders already placed and the like) and/or a communication option for a customer.

Advantageously, the plurality of information sources includes an information source for method parameters. Advantageously, the plastic-extrusion system comprises at least one sensor for detecting a method parameter, and preferably several sensors for detecting several method parameters. The information source for method parameters preferably supplies at least one instantaneous value or multiple instantaneous values of method parameters. It is possible for the transmission of the instantaneous values to take place directly to the operator station. The information source for method parameters could be the sensor or the sensors per se. According to another embodiment, the instantaneous values may initially be stored in a database. In this way, it is possible to record progressions of values of the method parameter or method parameters, for example. The operator station may have access to the database holding the stored value progressions. The information source for method parameters preferably comprises a database including stored value progressions of one or more sensors and/or instantaneous values of one or more sensors.

It is preferred that the information sources include an information source for commercial data. The term "commercial data" refers in particular to business information, for example with respect to order processes and/or invoices and/or deliveries and/or order receipts and/or production and/or stock keeping and/or human resources and/or sales and/or accounting and/or controlling and/or quality management. The information source for commercial data preferably comprises a database.

According to a particularly preferred embodiment, the plurality of information sources includes an information source having a communication interface to a vendor of the plastic-extrusion system and/or a raw material supplier, and the communication interface preferably includes an interface to a technical service department and/or to sales and/or to a database containing technical information of the vendor and/or of the raw material supplier. The term "sales" refers, for example, to a sales service department and/or an inventory management system of the vendor and/or of the raw-material supplier. The database containing technical information of the vendor is preferably populated with basic technical knowledge and/or details and/or empirical values. The populating preferably takes place by the vendor and/or the user and/or other users.

Advantageously, the operator station is configured to transmit data of the plastic-extrusion system, and in particular image data of the ongoing production operation, to the vendor at the site of the plastic-extrusion system. Advantageously, the operator station includes a reporting module. The operator station may be configured for video and/or telephone conferences. According to further advantageous embodiments, the operator station includes a screen switching function and/or a whiteboard function.

It is particularly advantageous when the operator station is configured such that information from at least one of the plurality of information sources is automatically offered or displayed on the graphical user interface of the operator station for active or passive selection of at least one of the system components. The term "active selection" refers in particular to a selection of one or more of the system components made at the initiative of the user. This may be the reading in of a QR code or the entering of a number of a system component, for example. The term "passive selection," in contrast, refers in particular to a selection not made by the user. This may be a warning signal of one or more of the system components and/or of sensors and/or of the system controller, for example. The term "offer" preferably means that appropriate selection options for information regarding the system component in question are displayed on the graphical user interface for the user. The term "display" means that the information does not have to be selected first, but at least some of it is shown directly on the graphical user interface. This display of information is a particularly preferred embodiment of context sensitivity.

It is preferred that the screen is touch sensitive and preferably has a screen size of greater than or equal to 4 inches. In particular, the operator station is configured such that a keyboard appears in a context-sensitive manner. The screen size is preferably at least 5 or 6 or 7 inches in size. Advantageously, the screen size is smaller than 14 inches or 12 inches. According to a particularly preferred embodiment, the operator station includes the option of a radio connection, and preferably a WLAN connection and/or a mobile communication connection and/or a Bluetooth interface.

According to a very preferred embodiment, the operator station is configured such that data is only transmitted upon instruction from or with the consent of the user. Advantageously, the operator station is configured such that an initial poll takes place during an installation process, during which the vendor can be granted access rights. The access rights relate, in particular, to method parameters. Advantageously, the operator station is configured such that, if access rights are granted, the user then has access to a database containing technical information of the vendor. The operator station may also be configured such that, in the case of maintenance inquiries, the user is expressly asked, for example by an appropriate pop-up window, whether and what technical data regarding the plastic-extrusion system may be transmitted to the vendor.

It is advantageous when the graphical user interface includes selectable symbols for gesture control, and at least some of the selectable symbols are arranged in a partial circle or a full circle on an edge of the graphical user interface so as to be reachable using a thumb. Preferably, at least two partial or full circles are displayed on the graphical user interface. More preferably, both partial or full circles are each associated with an edge of the graphical user interface, and the two edges are preferably opposite one another. It is advantageous when the circle radius, symbol size, symbol quantity, symbol distance, symbol labeling, and symbol graphics can be freely selected for individual adjustment. It is possible for the selectable symbols to be movable, and in particular rotatable, into the non-visible part of the graphical user interface. According to an advantageous embodiment, the operator station offers a selection of available languages for the graphical user interface.

According to a particularly preferred embodiment, the plurality of information sources includes an information source regarding documentation of the plastic-extrusion system. The information source regarding documentation may, for example, be located directly on the operator station, on a line server, an arbitrary other processor of the user, or on a processor of the vendor of the plastic-extrusion system. The term "documentation" refers in particular to operating guidelines, a list of frequent warning messages, along with the recommended action, tutorials and the like. The documentation may come from the vendor and/or may be supplemented by the user.

To achieve the object, the invention teaches a method of operating a plastic-extrusion system, and in particular a plastic-extrusion system according to the invention, and the plastic-extrusion system comprises a plurality of system components including an extruder and a device for collecting the extruded plastic material, the plastic-extrusion system having an operator station designed for taking in and outputting data of the plastic-extrusion system, the operator station having a mobile terminal including a screen of a graphical user interface, the operator station having a camera, the plastic-extrusion system being associated with at least one information source, and preferably a plurality of information sources, and the operator station being configured so as to access the at least one information source, and preferably the plurality of information sources.

The invention is based on the discovery that the operation and monitoring of the ongoing production of conventional plastic-extrusion systems at times involves significant complexity. This complexity results from the fact that an excellent command of very large volumes of information is required to operate modern plastic-extrusion systems. The information can come from various information sources, but the information sources previously have been provided in scattered locations. For example, the employee in charge must frequently get access to a first information source so as to thereafter access another information source. Quite often, it is then required to access yet another information source. The cases of plastic-extrusion systems known from practical experience usually necessitated a dedicated electronic device for each information source, so that the employee often had to change locations. Quite frequently, this was associated with considerable inefficiencies. The present invention solves this problem and considerably decreases the complexity.

BRIEF DESCRIPTION OF THE DRAWING

The above and other objects, features, and advantages will become more readily apparent from the following description, reference being made to the accompanying drawing whose sole FIGURE is a schematic view illustrating the invention.

SPECIFIC DESCRIPTION OF THE INVENTION

As seen in the sole FIGURE, the plastic-extrusion system first of all comprises a plurality 1 of system components 2, 3, 4, 9. An extruder 2 outputs plastic that is then treated in a device 3 and finally collected by a device 4. The treatment device 3 can comprise a spinneret, for example, so that the extruded plastic material is initially deposited as a nonwoven fabric and then wound on the collection device 4 into a roll. This is shown in the figure by the lower section of the treatment device 3. However, the treatment device 3 may also be a device for blowing a film, and the collection device 4 then winds the blown film instead of the nonwoven fabric. This is indicated by the upper section of the treatment device 3. It is pointed out that the treatment device 3 is preferably only designed for one extrusion type and comprises either the upper or the lower section of the treatment device 3. The system components 2, 3, 4 are preferably also activated by the system component 9 that is a controller.

The plastic-extrusion system furthermore comprises an operator station 5 that in this embodiment is designed as a tablet having a touch screen 6 having a graphical user interface 6 and includes a camera 7. The operator station furthermore comprises a read module 10 in the form of a laser scanner. The graphical user interface of the operator station 5 includes, in particular, selectable symbols 16, and the selectable symbols 16 are arranged in two partial circles on the right and left on the edges for thumb control.

The operator station 5 in this embodiment is designed to control the system controller 9 and therethrough the remaining system components 2, 3, 4. Moreover, the operator station 5 has access to an information source 8 holding documentation of the plastic-extrusion system, an information source 11 for method parameters in the form of a database containing these method parameters, and an information source 13 for commercial data. The information source for commercial likewise comprises a database. The operator station 5 furthermore comprises a Bluetooth interface, a WLAN interface and a mobile communication interface so that the user can make direct contact via the information source 14 with the vendor of the plastic-extrusion system and/or with a raw-material supplier. The user interface 5 is in particular configured to conduct telephone and/or video conferences.

In this embodiment, the extruder 2 and the treatment device 3 each have a QR code on a sticker. The read module 10 is able to identify the individual system components 2, 3, 4 based on the QR code. With the aid of the camera 7 and object recognition software, according to another embodiment the identification of the respective system component 2, 3, 4, 9 may also take place without a QR code. Finally, the system components 2, 3, 4 are also provided with sensors 12, as is apparent in the FIGURE by example from a sensor 12 on the treatment device 3. The sensor 12 continuously ascertains instantaneous values of a method parameter. The values of the method parameter or method parameters are stored in the information source 11 for method parameters, to which the operator station 5 has access.

Hereafter, typical situations will be described that are specifically addressed by the invention. For example, the operator station 5 receives a warning signal about a certain system component 2, 3, 4, 9 from an system component 2, 3, 4, 9 or a sensor 12. As a result of the context-sensitive human machine interface 5, an image of the corresponding system component 2, 3, 4, 9, along with a description, is promptly displayed on the graphical user interface of the operator station 5. The warning takes place acoustically or visually, for example, and, as in the present example, contains the instruction that the employee should go to the corresponding system component 2, 3, 4, 9.

Once the employee has arrived in front of the corresponding system component 2, 3, 4, the employee for instance may not able to see anything unusual with the naked eye. However, a context-sensitive selection menu of the graphical user interface of the operator station 5 offers a progression of certain method parameters that may be viewed. This progression appears suspicious to the employee, but the employee does not know how to respond in such an event.

For this reason, the employee at the same time is granted access to the information source 8 including the documentation via another highlighted item in the selection menu. This information source 8 will instruct the employee that, in the case of this anomaly, the involvement of the technical service department of the vendor is needed. For this reason, a telephone number for the technical service department of the vendor is also highlighted on the graphical user interface. By simply tapping on the number, the employee dials the telephone number and then learns from the technical service department of the vendor that a video must be recorded of a certain part of this system component 2, 3, 4, or 9. The employee then goes to the necessary position and records the video that is promptly transmitted via the operator station to the technical service department. The technical service department identifies the problem and provides appropriate instructions or sends a field employee to the site.

According to another situation, the employee performs a routine check. The employee notices an anomaly on a certain system component 2, 3, 4, 9 and scans the corresponding QR code 15. The corresponding system component 2, 3, 4, 9 along with the description is then displayed on the operator station 5, and the employee is able to access the progressions of the corresponding method parameters that, however, do not show any peculiarities. The employee then consecutively turns to information sources 8 and 14 until the problem is eliminated.

In another situation, the user receives a warning that the raw material in the plastic-extrusion system is running low. The employee is offered a selection menu for accessing the information source 13 regarding commercial data. This source shows that a large amount of raw material in the form of a certain plastic was ordered just recently and is already in the warehouse. At the same time, the telephone number of the warehouse stocker is shown. Also, an option is offered for sending a prewritten e-mail to the raw material supplier for reordering.

We claim:

1. A method of operating a plastic-extrusion system comprising a plurality of components including an extruder and a collection device for collecting the extruded plastic material, the method comprising the steps of:

providing each of the components with read data unique to the respective component;

providing a mobile terminal designed for taking in and outputting data of the plastic-extrusion system and having a screen of a graphical user interface, a reader for reading the read data, and a camera, associating the plastic-extrusion system with an information source holding data about each of the components and going beyond the read data provided on the components, the mobile terminal being configured to access the information source;

reading the read data with the reader to identify a one of the components and then connecting with the information source and downloading therefrom data regarding the identified component; and displaying with the mobile terminal information from the information source regarding the identified component on the screen of the mobile terminal and going beyond the informational content of the read data read out by the read module.

2. The plastic-extrusion method defined in claim 1, wherein the mobile terminal is context-sensitive.

3. The plastic-extrusion method defined in claim 1, wherein the mobile terminal is teachable.

4. The plastic-extrusion method defined in claim 1, wherein the plurality of information sources includes an information source for method parameters.

5. The plastic-extrusion method defined in claim 1, wherein the plurality of information sources includes an information source for commercial data.

6. The plastic-extrusion method defined in claim 1, wherein the plurality of information sources includes an information source having a communication interface to a vendor of the plastic-extrusion system or a raw material supplier.

7. The plastic-extrusion method defined in claim 6, wherein the mobile terminal transmits image data of the ongoing production operation and obtained by the camera to the vendor at the site of the plastic-extrusion system.

8. The plastic-extrusion method defined in claim 1, wherein the mobile terminal is configured such that information from the information source is automatically offered or displayed on the graphical user interface of the mobile terminal for active or passive selection of at least one of the components.

9. The plastic-extrusion method defined in claim 8, wherein the mobile terminal is configured such that data is only transmitted upon instruction from or with the consent of a user of the mobile terminal.

10. The plastic-extrusion method defined in claim 1, wherein the graphical user interface includes selectable symbols for gesture control, at least some of the selectable symbols being arranged in a partial or full circle on an edge of the graphical user interface so as to be reachable by a thumb of a user of the station.

11. The plastic-extrusion method defined in claim 1, wherein the plurality of information sources includes an information source holding documentation of the plastic-extrusion system.

* * * * *